US009612910B2

United States Patent
Kulkarni et al.

(10) Patent No.: US 9,612,910 B2
(45) Date of Patent: Apr. 4, 2017

(54) SYSTEMS AND METHODS FOR GENERATING CATALOGS FOR SNAPSHOTS

(71) Applicant: Symantec Corporation, Mountain View, CA (US)

(72) Inventors: Niteen Kulkarni, Pune (IN); Sourabh Gupta, Pune (IN); Gaurav Malhotra, Pune (IN)

(73) Assignee: Veritas Technologies, Mountain View, CA (US)

( * ) Notice: Subject to any disclaimer, the term of this patent is extended or adjusted under 35 U.S.C. 154(b) by 379 days.

(21) Appl. No.: 14/172,137

(22) Filed: Feb. 4, 2014

(65) Prior Publication Data

US 2015/0178167 A1 Jun. 25, 2015

(30) Foreign Application Priority Data

Dec. 23, 2013 (IN) .......................... 4020/MUM/2013

(51) Int. Cl.
*G06F 7/00* (2006.01)
*G06F 17/00* (2006.01)
(Continued)

(52) U.S. Cl.
CPC .... *G06F 11/1446* (2013.01); *G06F 17/30595* (2013.01); *G06F 21/60* (2013.01); *G06F 21/6218* (2013.01)

(58) Field of Classification Search
CPC ........... G06F 11/1451; G06F 17/30067; G06F 3/064; G06F 3/067; G06F 11/14
(Continued)

(56) References Cited

U.S. PATENT DOCUMENTS 6,865,655 B1* 3/2005 Andersen ............ G06F 11/1453
  707/999.202
7,266,655 B1* 9/2007 Escabi, II ........... G06F 11/1448
  707/999.202
(Continued)

OTHER PUBLICATIONS

Symantec Corportation, "Symantec NetBackup 7.5 Administrator's Guide for Windows, vol. I", http://www.symantec.com/business/support/index?page=content&id=DOC5159, as accessed Oct. 31, 2013, (Jan. 11, 2012).
(Continued)

*Primary Examiner* — Robert Beausoliel, Jr.
*Assistant Examiner* — Michael Pham
(74) *Attorney, Agent, or Firm* — Fisherbroyles LLP

(57) ABSTRACT

A computer-implemented method for generating catalogs for snapshots may include (1) identifying an initial snapshot and a subsequent snapshot for a protected volume, (2) providing identifiers of the initial snapshot and the subsequent snapshot to a storage vendor application programming interface (API), (3) receiving, from the storage vendor API, an indication of at least one difference between the initial snapshot and the subsequent snapshot, and (4) synthetically generating a catalog for the subsequent snapshot based on a preexisting catalog for the initial snapshot such that the synthetically generated catalog reflects the difference between the initial snapshot and the subsequent snapshot indicated by the storage vendor API. Various other methods, systems, and computer-readable media are also disclosed.

20 Claims, 7 Drawing Sheets

(51) Int. Cl.
 *G06F 11/14* (2006.01)
 *G06F 17/30* (2006.01)
 *G06F 21/60* (2013.01)
 *G06F 21/62* (2013.01)

(58) Field of Classification Search
 USPC .......................................................... 707/646
 See application file for complete search history.

(56) References Cited

U.S. PATENT DOCUMENTS

| | | | | |
|---|---|---|---|---|
| 8,495,022 | B1 * | 7/2013 | Zhu | G06F 11/1451 |
| | | | | 707/645 |
| 8,825,972 | B1 * | 9/2014 | Tsaur | G06F 11/1453 |
| | | | | 707/646 |
| 9,069,709 | B1 * | 6/2015 | Natanzon | G06F 11/1446 |
| 2004/0267835 | A1 * | 12/2004 | Zwilling | G06F 11/1451 |
| 2007/0150587 | A1 * | 6/2007 | D'Alo | G06F 11/3466 |
| | | | | 709/224 |
| 2010/0058010 | A1 * | 3/2010 | Augenstein | G06F 11/1451 |
| | | | | 711/162 |
| 2012/0101997 | A1 * | 4/2012 | Zwilling | G06F 11/1451 |
| | | | | 707/649 |

OTHER PUBLICATIONS

Netapp, Inc., "What SnapDiff is", https://library.netapp.com/ecmdocs/ECMP1196874/html/GUID-C2793E0D-0AB5-40FD-9F36-324F3178FF6F.html, as accessed Oct. 31, 2013, (May 2013).
IBM, "Snapdiff", http://publib.boulder.ibm.com/infocenter/tsminfo/v6/index.jsp?topic=%2Fcom.ibm.itsm.client.doc%2Fr_opt_snapdiff.html, as accessed Oct. 31, 2013, IBM Tivoli Storage Manager Version 6.1 documentation, (Aug. 2010).

* cited by examiner

SYSTEMS AND METHODS FOR GENERATING CATALOGS FOR SNAPSHOTS

BACKGROUND

Persons and organizations often perform backup operations to protect important data. In some cases, these backup operations may create snapshots, which may record and preserve the state of data at a single point in time. The backup operations may also create a catalog that tracks metadata about files and data within the snapshot. The catalog may enable the tracking, searching, browsing, locating, editing, and/or restoration (e.g., granular or selective restoration) of the files and data within the snapshot. For example, in some conventional systems, access to the catalog may be needed to restore files and data within a snapshot.

In these conventional systems, generating a catalog may consume large amounts of time and storage. For example, generating a catalog may involve mounting a snapshot on a client, traversing an entire file hierarchy within the snapshot, and while traversing the file hierarchy, generating the catalog, and then dismounting the snapshot from the client. In this example, the time consumed generating the catalog may be directly proportional to the number of files and/or directories in the snapshot. A typical snapshot may include a large number of files (e.g., millions of files), and generating a catalog for such a snapshot may involve a significant amount of time and resources. What is needed, therefore, is a more efficient and effective way to generate catalogs for snapshots.

SUMMARY

As will be described in greater detail below, the instant disclosure generally relates to systems and methods for generating catalogs for snapshots by (1) identifying an initial snapshot and a subsequent snapshot for a protected volume, (2) providing identifiers of the initial snapshot and the subsequent snapshot to a storage vendor application programming interface (API), (3) receiving, from the storage vendor API, an indication of at least one difference between the initial snapshot and the subsequent snapshot, and (4) synthetically generating a catalog for the subsequent snapshot based on a preexisting catalog for the initial snapshot such that the synthetically generated catalog reflects the difference between the initial snapshot and the subsequent snapshot indicated by the storage vendor API.

In one example, synthetically generating the catalog for the subsequent snapshot may be performed without mounting the subsequent snapshot on a client. Receiving, from the storage vendor API, the indication of the difference between the initial snapshot and the subsequent snapshot may be performed in response to a request for the indication of the difference. The request for the indication of the difference may include a request for all files that were at least one of modified, deleted, and created between the initial snapshot and the subsequent snapshot.

In some embodiments, the indication of the difference between the initial snapshot and the subsequent snapshot indicates a change in file metadata. In some examples, the indication of the difference indicates a file path of a file that was created, modified, and/or deleted. The identifier of the initial snapshot may include an identifier of a most recent snapshot, and the identifier of the subsequent snapshot may include a command to create a new snapshot.

In some embodiments, synthetically generating the catalog for the subsequent snapshot may include conserving storage space by omitting the creation of data in the catalog for the subsequent snapshot that is unchanged from the preexisting catalog for the initial snapshot. In some examples, synthetically generating the catalog for the subsequent snapshot may include associating the indication of the difference between the initial snapshot and the subsequent snapshot with the preexisting catalog for the initial snapshot.

In some embodiments, synthetically generating the catalog for the subsequent snapshot may include modifying the preexisting catalog for the initial snapshot such that the synthetically generated catalog reflects the difference between the initial snapshot and the subsequent snapshot indicated by the storage vendor API. The method may also include directing requests for data in the synthetically generated catalog that is unchanged from the preexisting catalog to the preexisting catalog.

In one embodiment, a system for implementing the above-described method may include (1) an identification module, stored in memory, that identifies an initial snapshot and a subsequent snapshot for a protected volume, (2) a provisioning module, stored in memory, that provides identifiers of the initial snapshot and the subsequent snapshot to a storage vendor API, (3) a reception module, stored in memory, that receives, from the storage vendor API, an indication of at least one difference between the initial snapshot and the subsequent snapshot, (4) a generation module, stored in memory, that synthetically generates a catalog for the subsequent snapshot based on a preexisting catalog for the initial snapshot such that the synthetically generated catalog reflects the difference between the initial snapshot and the subsequent snapshot indicated by the storage vendor API, and (5) at least one physical processor that executes the identification module, the provisioning module, the reception module, and the generation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify an initial snapshot and a subsequent snapshot for a protected volume, (2) provide identifiers of the initial snapshot and the subsequent snapshot to a storage vendor API, (3) receive, from the storage vendor API, an indication of at least one difference between the initial snapshot and the subsequent snapshot, and (4) synthetically generate a catalog for the subsequent snapshot based on a preexisting catalog for the initial snapshot such that the synthetically generated catalog reflects the difference between the initial snapshot and the subsequent snapshot indicated by the storage vendor API.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
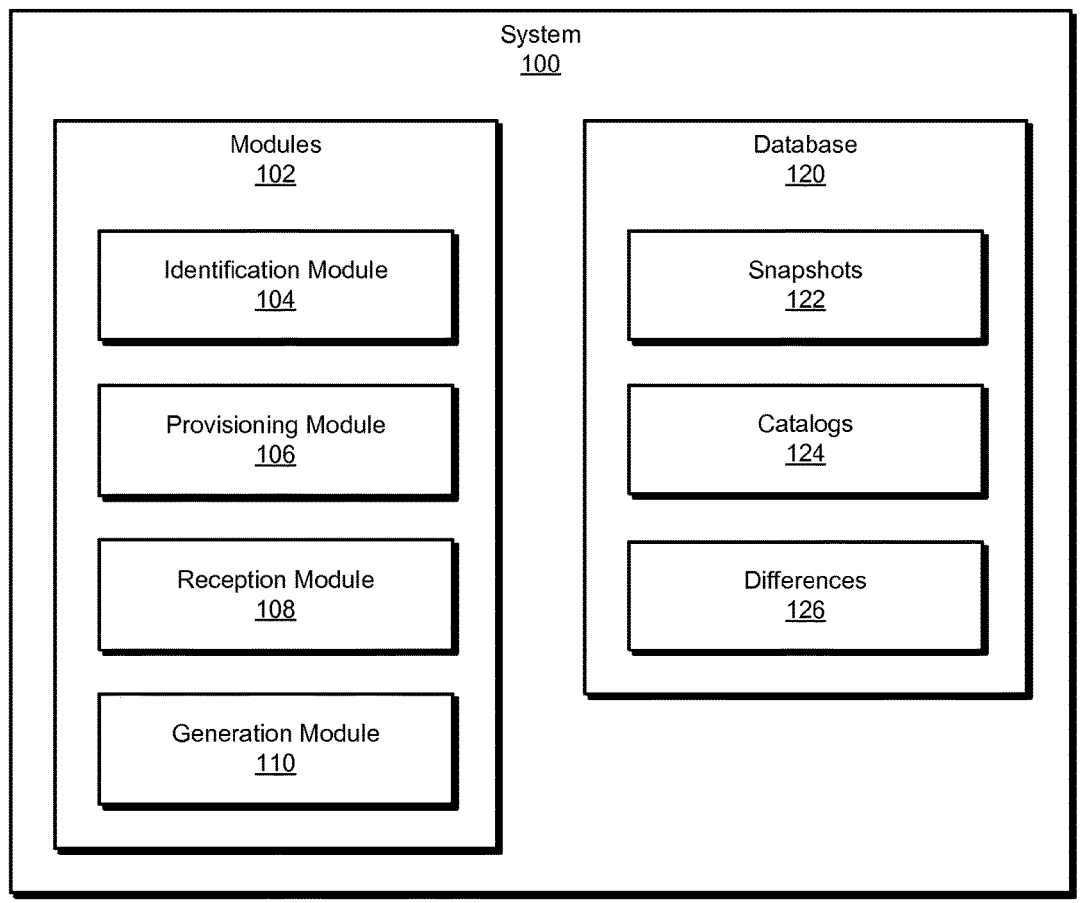
FIG. 1 is a block diagram of an exemplary system for generating catalogs for snapshots.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for generating catalogs for snapshots. As will be explained in greater detail below, the disclosed systems and methods may dramatically increase the speed of generating a catalog for a snapshot in comparison to other conventional methods. For example, the disclosed systems and methods may enable the generation of a catalog for a snapshot without mounting the snapshot on a client. Moreover, these systems and methods may also conserve storage space by omitting the storage of catalog information that is redundant to information within a previous catalog for a previous snapshot.

Figure 2:
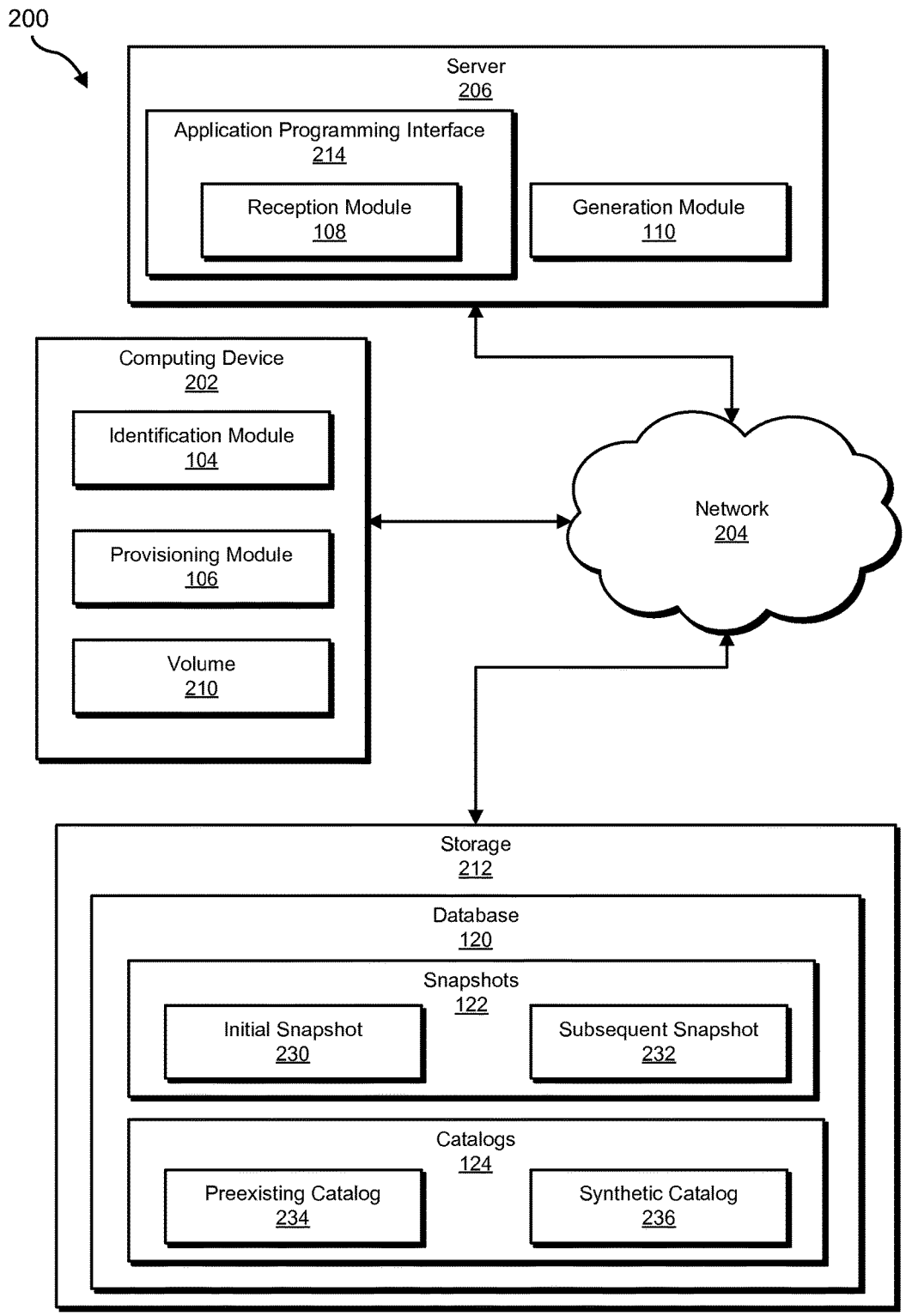
FIG. 2 is a block diagram of an additional exemplary system for generating catalogs for snapshots.

The following will provide, with reference to FIGS. 1-2, detailed descriptions of exemplary systems for generating catalogs for snapshots. Detailed descriptions of corresponding computer-implemented methods will also be provided in connection with FIG. 3. Moreover, detailed descriptions of exemplary snapshots, catalogs, and differences between snapshots will be provided in connection with FIGS. 4 and 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for generating catalogs for snapshots. As illustrated in this figure, exemplary system 100 may include one or more modules 102 for performing one or more tasks. For example, and as will be explained in greater detail below, exemplary system 100 may include an identification module 104 that identifies an initial snapshot and a subsequent snapshot for a protected volume. Exemplary system 100 may also include a provisioning module that provides identifiers of the initial snapshot and the subsequent snapshot to a storage vendor API.

In addition, and as will be described in greater detail below, exemplary system 100 may include a reception module 108 that receives, from the storage vendor API, an indication of at least one difference between the initial snapshot and the subsequent snapshot. Exemplary system 100 may also include a generation module 110 that synthetically generates a catalog for the subsequent snapshot based on a preexisting catalog for the initial snapshot such that the synthetically generated catalog reflects the difference between the initial snapshot and the subsequent snapshot indicated by the storage vendor API. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store snapshots 122, catalogs 124, and/or differences 126. As used herein, the phrase "snapshot" may generally refer a data structure that records and preserves the state of data (e.g., on a volume) at a particular point in time. Similarly, the phrase "catalog" may generally refer to a data structure that enables tracking of contents of media created during a backup or archive operation, such as a snapshot operation. In some embodiments, restoration of backup data may involve a catalog. As a third item within database 120, differences 126 may generally indicate differences between initial and subsequent snapshots on the same volume of data, as discussed further below.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In general, computing device 202 may provide access to a protected volume 210. Computing device 202 may serve as a client through which a user or program may access and/or modify protected volume 210. In contrast, server 206 may provide a storage vendor API 214 that may receive requests for data from computing device 202 and generate results through generation module 110. Server 206 may also manage and maintain data in a storage 212, which may optionally include database 120. Generation module 110 may generate results of the API query and/or further results based on the initial results from the API query. In some embodiments, most or all of modules 102 may reside within a single one of computing device 202, server 206, and/or another device.

In one embodiment, one or more of modules 102 from FIG. 1 may, when executed by at least one processor of computing device 202 and/or server 206, enable computing device 202 and/or server 206 to generate catalogs for snapshots. For example, and as will be described in greater detail below, one or more of modules 102 may cause computing device 202 and/or server 206 to (1) identify an initial snapshot 230 and a subsequent snapshot 232 for protected volume 210, (2) provide identifiers of initial snapshot 230 and subsequent snapshot 232 to storage vendor API 214, (3) receive, from storage vendor API 214, an indication of at least one difference between initial snapshot 230 and subsequent snapshot 232, and (4) synthetically generate a synthetic catalog 236 for subsequent snapshot 232 based on a preexisting catalog 234 for initial snapshot 230 such that synthetic catalog 236 reflects the difference between initial snapshot 230 and subsequent snapshot 232 indicated by storage vendor API 214.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Server 206 generally represents any type or form of computing device that is capable of managing storage 212, generating catalogs for snapshots, and/or providing storage vendor API 214. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
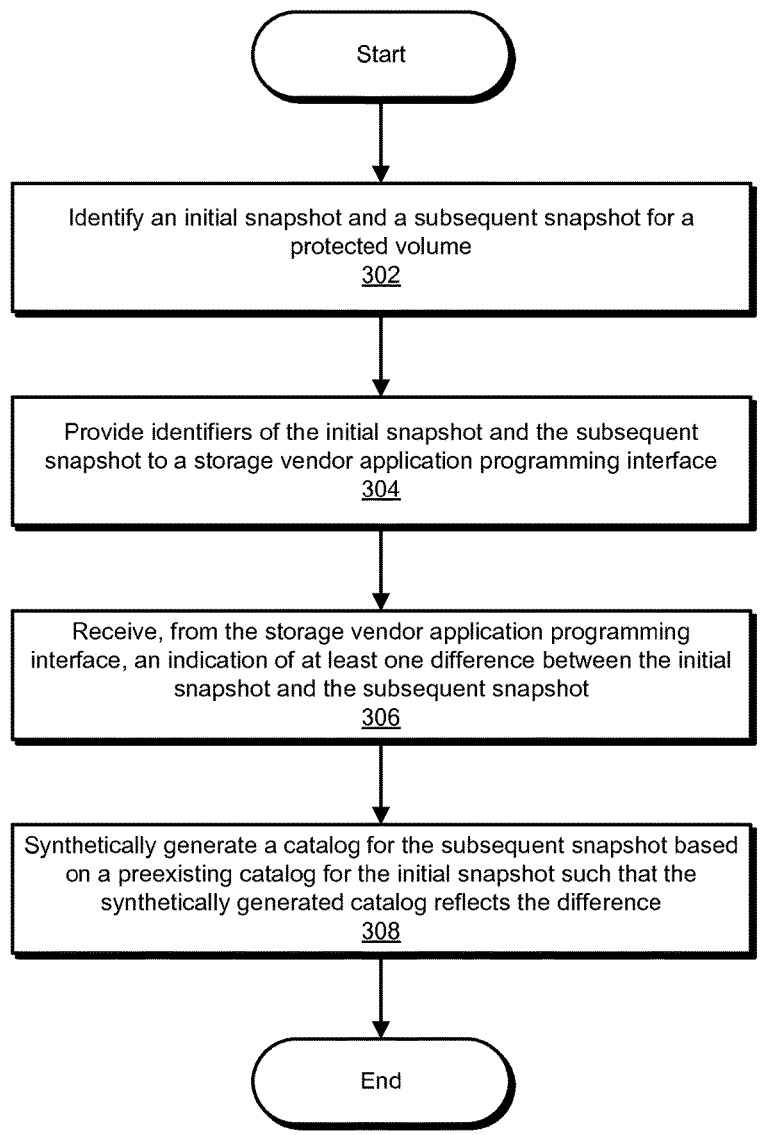
FIG. 3 is a flow diagram of an exemplary method for generating catalogs for snapshots.

FIG. 3 is a flow diagram of an exemplary computer-implemented method 300 for generating catalogs for snapshots. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify an initial snapshot and a subsequent snapshot for a protected volume. For example, identification module 104 may, as part of computing device 202 in FIG. 2, identify initial snapshot 230 and subsequent snapshot 232 for protected volume 210.

Identification module 104 may identify the initial snapshot and the subsequent snapshot in a variety of ways. Identification module 104 may identify the snapshots by receiving a command that instructs the creation of one or both snapshots. Identification module 104 may receive user input that designates one or both snapshots. Identification module 104 may also receive a backup policy that specifies a predetermined schedule for creating one or both snapshots. In some cases, identification module 104 may receive alphanumeric textual or other identifiers for one or both snapshots. In other cases, identification module 104 may receive a command or other indication that identifies a snapshot as the currently generated snapshot and/or as the previously-generated snapshot. In some embodiments, identification module 104 may receive a backup policy that specifies predetermined defaults for identifying one or both snapshots. In these cases, reception of a command without an explicit reference to one or both snapshots may identify the corresponding snapshot(s) according to the predetermined defaults.

At step 304 one or more of the systems described herein may provide identifiers of the initial snapshot and the subsequent snapshot to a storage vendor API. For example, provisioning module 106 may, as part of computing device 202 in FIG. 2, provide identifiers of initial snapshot 230 and subsequent snapshot 232 to storage vendor API 214. As used herein, the phrase "storage vendor application programming interface" generally refers to any programming interface provided by, or associated with, an individual or organization that provides or facilitates data storage. As used herein, the phrase "application programming interface" or "API" generally refers to any specification of how some computer and/or software components interact with each other. In primary embodiments, "API" generally refers to a software component that provides an interface for receiving and processing requests for data.

Provisioning module 106 may provide identifiers of the initial snapshot and the subsequent snapshot to a storage vendor API in a variety of ways. In general, provisioning module 106 may provide identifiers by providing any data (bit or bytes) that enables API 214 to identify, and/or complete an identification (e.g., designation), of the snapshots. Provisioning module 106 may provide identifiers of the snapshots in any manner parallel to how identification module 104 identifies these snapshots. Provisioning module 106 and identification module 104 may provide the identifiers and identify the snapshots as part of the same, integral command, or as part of different, discrete commands in sequence. In some cases, provisioning module 106 may provide an alphanumeric textual or other identifier, and/or pointer, for one or both snapshots to the storage vendor API. In some embodiments, provisioning module 106 may provide identifiers for the snapshots by providing a command that requests a comparison between two snapshots. If the request command does not explicitly specify one or both snapshots by name, provisioning module 106 may provide the identifiers by providing the request command using one or more default rules. For example, a command to compare two snapshots may include a parameter to generate a new snapshot, and the command may default to comparing the most recently created snapshot with the newly created snapshot. In that case, the identifier of the initial snapshot may include an identifier of a most recent snapshot. Similarly, the identifier of the subsequent snapshot may include a command to create a new snapshot.

At step 306 one or more of the systems described herein may receive, from the storage vendor API, an indication of at least one difference between the initial snapshot and the subsequent snapshot. For example, reception module 108 may receive, from storage vendor API 214, an indication of at least one difference between initial snapshot 230 and subsequent snapshot 232.

Reception module 108 may receive the indication of at least one difference between the initial snapshot and the subsequent snapshot in a variety of ways. Reception module 108 may receive, from the storage vendor API, the indication of the difference between the initial snapshot and the subsequent snapshot in response to a request for the indication of the difference. The request for the indication of the difference may include a request for all files that were modified, deleted, and/or created between the initial snapshot and the subsequent snapshot. The indication of the difference may indicate a file path of a file that was created, modified, and/or deleted. Alternatively, the request may include a request for some designated or all deleted files, some designated or all changed files, some designated or all new files, and/or some designated or all files having a change of a particular type or satisfying a specified condition (e.g., any specified change in any of the types of metadata discussed below). In other words, the request may include a Boolean or other formulaic query that narrows search results to a specific type of change, difference, and/or file.

Figure 4:
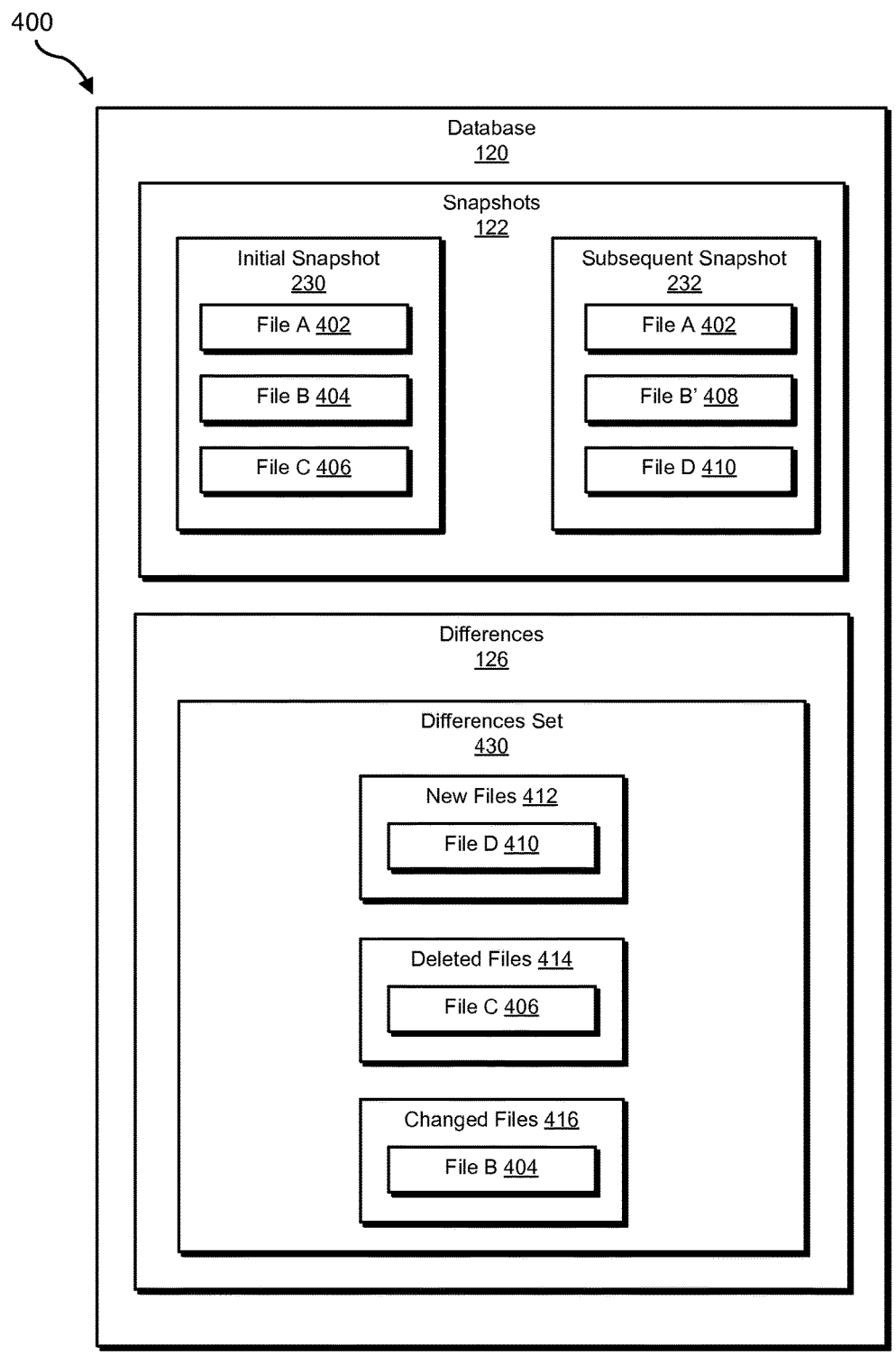
FIG. 4 is a block diagram of exemplary snapshots and differences between those snapshots.

FIG. 4 shows an exemplary block diagram of snapshots 122 and differences 126, one or both of which may optionally be stored within database 120. As shown in FIG. 4, initial snapshot 230 may include file A 402, file B 404, and file C 406. In contrast, subsequent snapshot 232 may include file A 402, file B' 408 (a modified version of file B 404), and file D 410. Reception module 108 may receive the indication of at least one difference between initial snapshot 230 and subsequent snapshot 232 in response to a request for all files that were modified, deleted, and created between the initial snapshot and the subsequent snapshot.

As shown in FIG. 4, API 214 may respond by generating a differences set 430, which may indicate the requested differences. Differences set 430 may include new files 412, which shows file D 410. Differences set 430 may also include deleted files 414, which shows file C 406. Similarly, differences set 430 may include changed files 416, which may show file B 404 (and/or file B' 408). Although differences set 430 only includes one file in each of new files 412, deleted files 414, and changed files 416, these lists may show more than one file. Moreover, although FIG. 4 shows differences in files, the disclosed systems and methods may equally apply to differences between directories. Furthermore, although reception module 108 in FIG. 4 receives an indication of all differences between initial snapshot 230 and subsequent snapshot 232, reception module 108 may similarly receive an indication of just a single difference and/or a proper subset of differences (defined according to a request, policy, and or default rule, as further discussed above). As shown in FIG. 4, differences set 430 may indicate that file D 410 is new in subsequent snapshot 232, that file C 406 has been deleted since initial snapshot 230, and that file B 404 has been modified since initial snapshot 230.

The indication of the difference between the initial snapshot and the subsequent snapshot may indicate a change in file metadata. In general, API 214 may indicate any difference between initial snapshot 230 and subsequent snapshot 232 that may improve, benefit, and/or enable generation of synthetic catalog 236. The difference may indicate a change in file name, file location (e.g., absolute or relative directory system path, and/or disk block start and/or end, and/or virtual and/or physical locations for one, some, and/or all file blocks), partial or complete file hash or fingerprint, file size, file last modified date, time, and/or type, security status, encryption status, virtualization status, change status of specified file blocks or segments, new and/or deleted file content, file type, and/or file extension, etc.

At step 308 one or more of the systems described herein may synthetically generate a catalog for the subsequent snapshot based on a preexisting catalog for the initial snapshot such that the synthetically generated catalog reflects the difference between the initial snapshot and the subsequent snapshot indicated by the storage vendor API. For example, generation module 110 may synthetically generate synthetic catalog 236 for subsequent snapshot 232 based on preexisting catalog 234 for initial snapshot 230 such that synthetic catalog 236 reflects the difference between initial snapshot 230 and subsequent snapshot 232 indicated by storage vendor API 214. As used herein, the phrase "synthetically generate" generally refers to incremental generation of a catalog based at least in part on a previous catalog, as opposed to entirely generating a new catalog without reference to a previous catalog.

Generation module 110 may generate the synthetic catalog for the subsequent snapshot in a variety of ways. Notably, generation module 110 may synthetically generate the catalog for the subsequent snapshot without mounting the subsequent snapshot on a client. Omitting the mounting and/or file hierarchy traversal of the snapshot may reduce the time consumed for generating the catalog by one or more orders of magnitude.

Generation module 110 may also synthetically generate the catalog for the subsequent snapshot in part by conserving storage space by omitting the creation of data in the catalog for the subsequent snapshot that is unchanged from the preexisting catalog for the initial snapshot. Generation module 110 may also synthetically generate synthetic catalog 236 for subsequent snapshot 232 in part by associating the indication of the difference between initial snapshot 230 and subsequent snapshot 232 with preexisting catalog 234 for initial snapshot 230.

Figure 5:
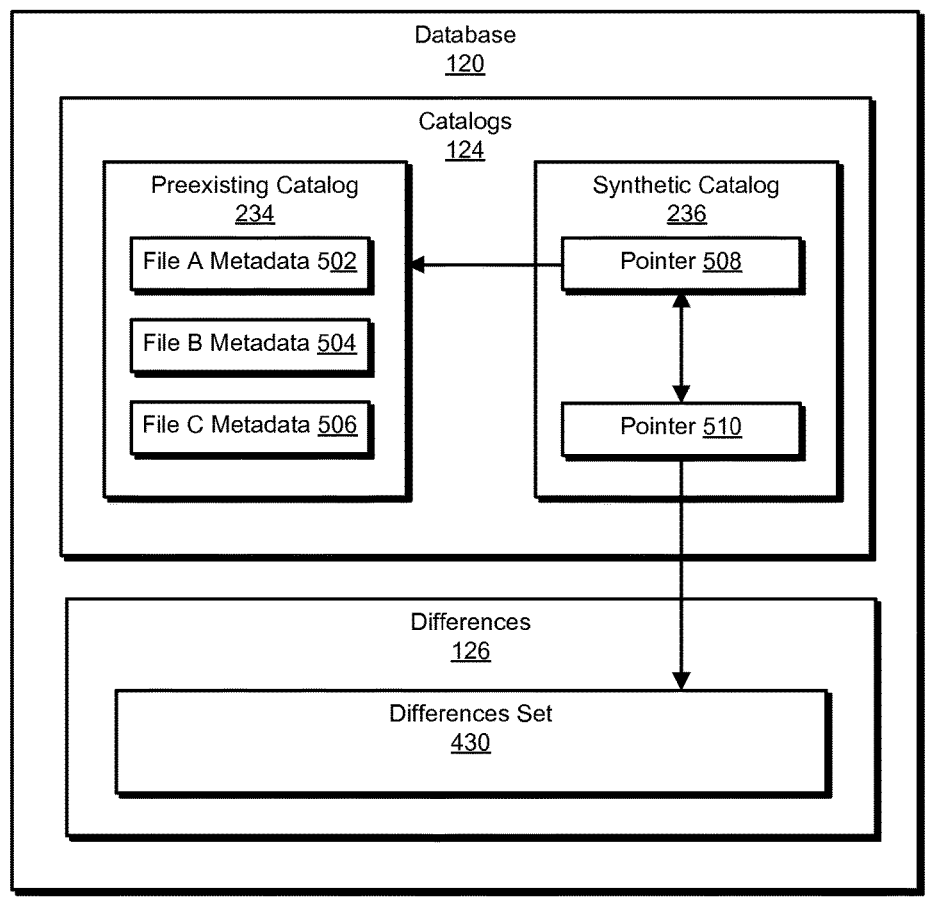
FIG. 5 is a block diagram of an exemplary preexisting catalog for a snapshot and an exemplary synthetic catalog for a subsequent snapshot.

FIG. 5 shows exemplary catalogs 124 and differences 126, which may optionally be stored in database 120. As shown in FIG. 5, catalogs 124 may include preexisting catalog 234 for initial snapshot 230 and synthetic catalog 236 for subsequent snapshot 232. Preexisting catalog 234 may include file A metadata 502, file B metadata 504, and file C metadata 506, which may correspond to file A 402, file B 404, and file C 406 in FIG. 4.

As further shown in FIG. 5, generation module 110 may synthetically generate synthetic catalog 236 based on preexisting catalog 234. In some examples, generation module 110 may synthetically generate synthetic catalog 236 by associating preexisting catalog 234 with differences set 430, thereby linking them. Generation module 110 may associate and/or link preexisting catalog 234 and differences set 430 by unifying them in a single file and/or single data structure and/or creating a relationship or correlation between them in a database or other data structure.

Moreover, generation module 110 may associate and/or link preexisting catalog 234 and differences set 430 in a manner that enables a restoration system to access, search, and/or restore (e.g., granularly or selectively restore) subsequent snapshot 232 by dynamically and/or selectively providing access to unchanged data in initial snapshot 230 and unchanged metadata in preexisting catalog 234 or applying differences set 430 to preexisting catalog 234 to enable access to changed data. For example, the restoration system may direct requests for data in synthetic catalog 236 that is unchanged in preexisting catalog 234 to preexisting catalog 234. Changes in snapshot data may correspond to changes in catalog metadata, so that redundancies in snapshot data may correspond to redundancies in catalog data (e.g., when parts of the snapshot do not change, then corresponding parts of the catalog also do not need to change). The restoration system may direct requests to preexisting catalog 234 using pointer 508. Similarly, generation module 110 may synthetically generate synthetic catalog 236 by including a pointer 510 to, and/or copy of, differences set 430 within synthetic catalog 236, or otherwise associating synthetic catalog 236 with differences set 430.

In some embodiments, generation module 110 may synthetically generate synthetic catalog 236 in part by modifying preexisting catalog 234 for initial snapshot 230 such that synthetic catalog 236 reflects the difference between initial snapshot 230 and subsequent snapshot 232 indicated by API 214. For example, instead of merely associating and/or linking preexisting catalog 234 and differences set 430, generation module 110 may modify a copy of preexisting catalog 234 (and/or selectively copy from preexisting catalog 234) to update the copy to reflect one or more differences detected by API 214 since initial snapshot 230. In the case where generation module 110 applies all existing, desired, and/or designated differences from differences set 430 to preexisting catalog 234, generation module 110 and/or another module may discard and/or delete differences set 430. Generation module 110 may also generate a new file or data structure in a format that parallels preexisting catalog 234 but includes one or more applied changes from differences set 430. Moreover, generation module 110 may similarly format and/or alter one or both of preexisting catalog 234 and/or differences set 430 to enable, facilitate, and/or improve the ability of a restoration system to use their combination as a synthetic catalog for subsequent snapshot 232 (e.g., to dynamically and/or selectively access data within one or both of preexisting catalog 234 and differences set 430).

The above discussion of FIG. 3 provided a detailed overview of the disclosed systems and methods. The following provides a higher-level overview of these systems and methods with a focus on primary embodiments.

Storage array vendors may provide APIs that specify differences between two backup snapshots. The disclosed systems and methods may leverage one or more of these APIs to obtain file and/or directory names that have been modified between two snapshots. The disclosed systems and methods may then reflect those differences into the catalog for the subsequent snapshot. The disclosed systems and methods may also thereby enable incremental scheduling for snapshots. Snapshots may still be performed on a volume, but the disclosed systems and methods may store only the differences in the catalog. Storing only the differences in the catalog may minimize the time involved in cataloging the snapshot. Storing only the differences may also save disk space to store catalog information, since the systems and methods may store only the incremental part of the snapshot.

As in greater detail above, the disclosed systems and methods may dramatically increase the speed of generating a catalog for a snapshot in comparison to other conventional methods. For example, the disclosed systems and methods may enable the generation of a catalog for a snapshot without mounting the snapshot on a client. Moreover, these systems and methods may also conserve storage space by omitting the storage of catalog information that is redundant to information within a previous catalog for a previous snapshot.

Figure 6:
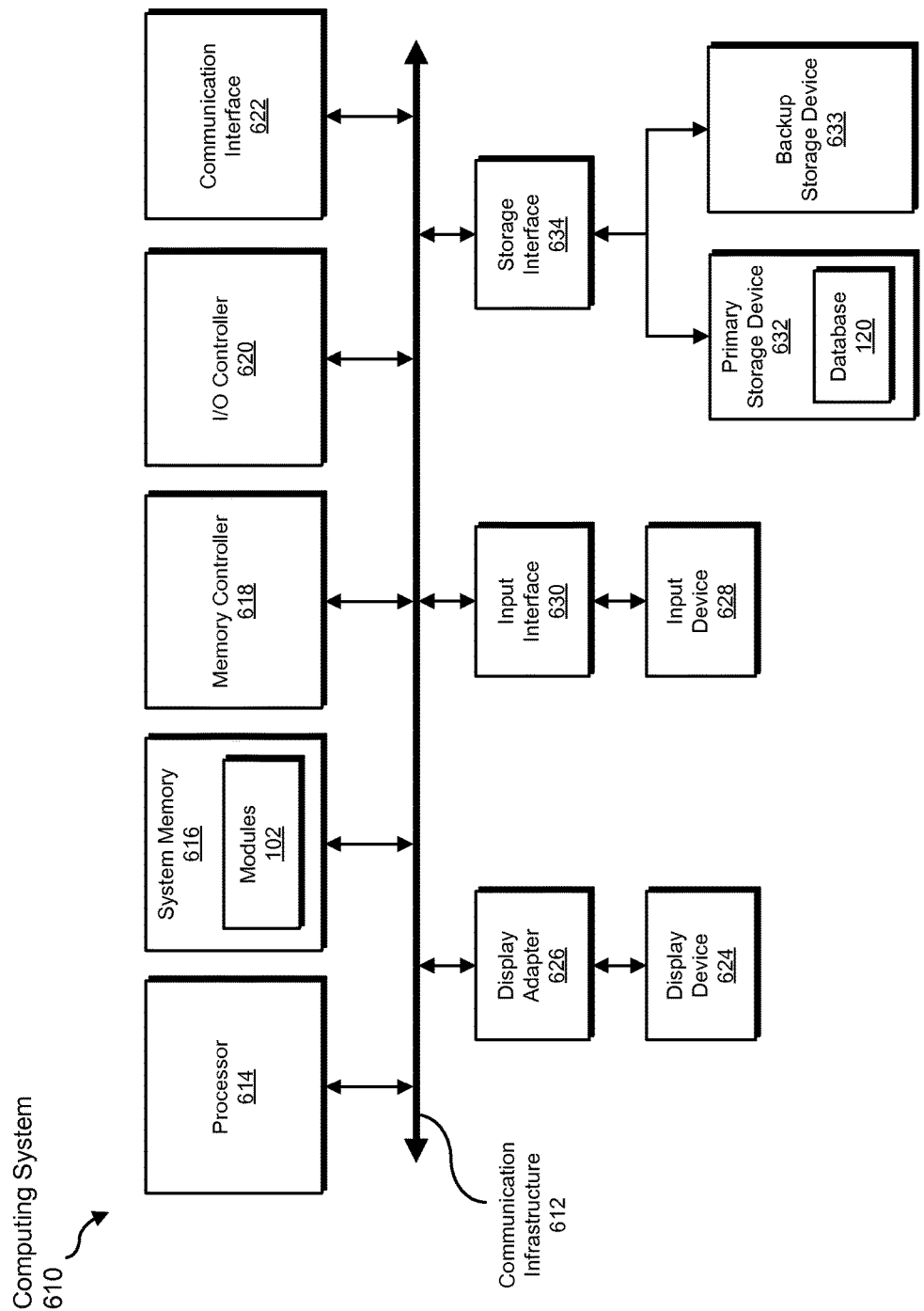
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
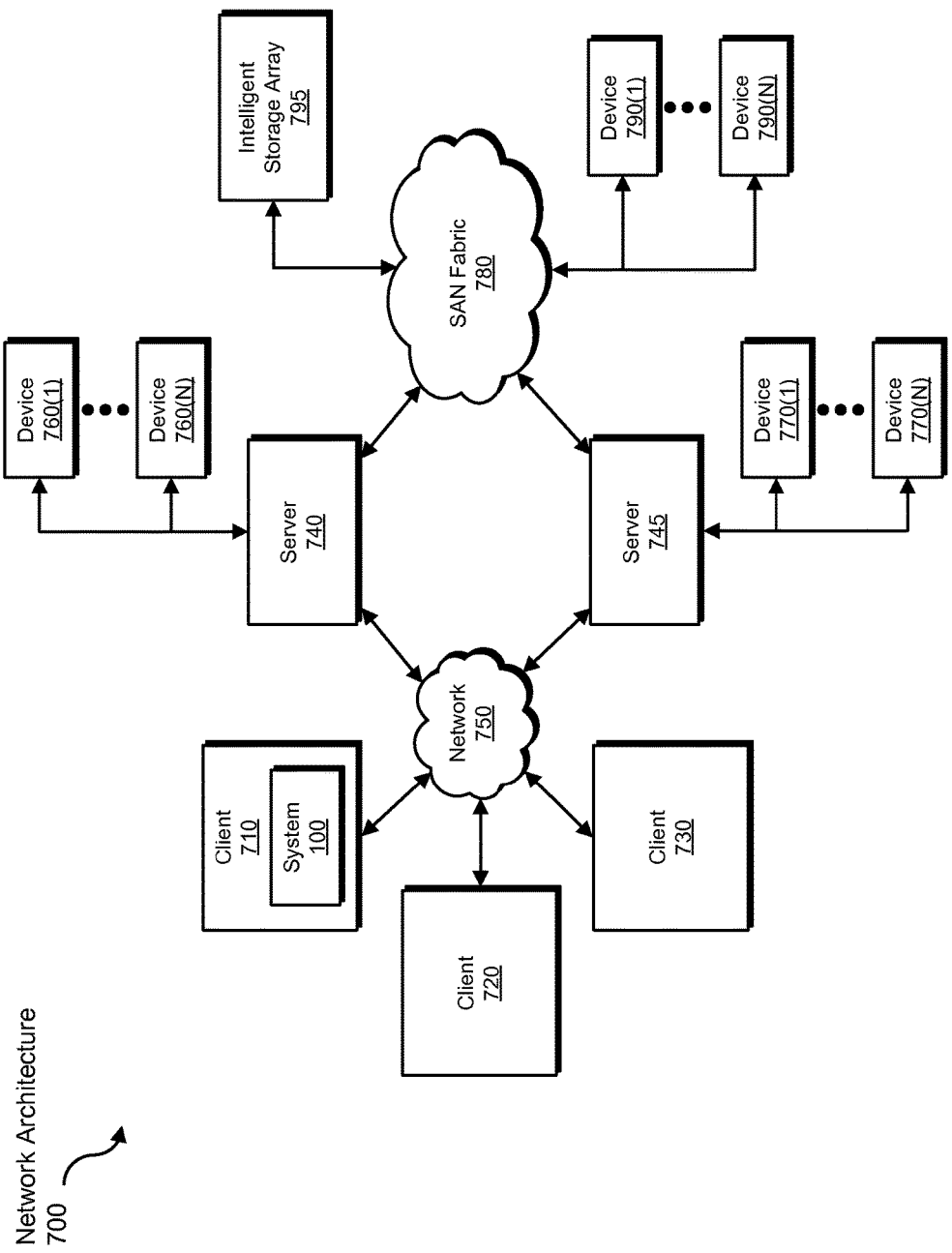
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for generating catalogs for snapshots.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive (A) requests and/or commands for snapshots and/or snapshot differences, (B) snapshots, and/or (C) indications of differences between snapshots to be transformed, transform the requests/commands, snapshots, and/or indications of differences, output a result of the transformation to a storage device, output device, monitor, and/or display, use the result of the transformation to synthetically generate a catalog for a snapshot, and store the result of the transformation to a storage medium. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for generating catalogs for snapshots, at least a portion of the method being performed by a computing device comprising at least one processor, the method comprising:

identifying an initial snapshot and a subsequent snapshot for a protected volume;

providing identifiers of the initial snapshot and the subsequent snapshot to a storage vendor application programming interface (API);

receiving, from the storage vendor API, an indication of at least one difference between the initial snapshot and the subsequent snapshot;

synthetically generating a catalog for the subsequent snapshot based on a preexisting catalog for the initial snapshot in an incremental manner by unifying the preexisting catalog and the indication of the difference in a single data structure such that the synthetically generated catalog reflects the difference between the initial snapshot and the subsequent snapshot indicated by the storage vendor API, wherein:

the indication of the difference is received in response to a request for all files that were at least one of modified, deleted, and created between the initial snapshot and the subsequent snapshot;

the preexisting catalog comprises a data structure that is separate from the initial snapshot and that tracks metadata about files within the initial snapshot to enable searching of the initial snapshot; and synthetically generating the catalog conserves storage space by omitting creation of data in the catalog for the subsequent snapshot that is unchanged from the preexisting catalog for the initial snapshot.

2. The method of claim 1, wherein synthetically generating the catalog for the subsequent snapshot is performed without mounting the subsequent snapshot on a client.

3. The method of claim 1, wherein identifying the initial snapshot and the subsequent snapshot for the protected volume comprises receiving a backup policy that specifies a predetermined schedule for creating the initial snapshot.

4. The method of claim 1, wherein identifying the initial snapshot and the subsequent snapshot for the protected volume comprises receiving an alphanumeric textual identifier for the initial snapshot.

5. The method of claim 1, wherein the indication of the difference between the initial snapshot and the subsequent snapshot indicates a change in file metadata.

6. The method of claim 1, wherein:

the identifier of the initial snapshot comprises an identifier of a most recent snapshot; and the identifier of the subsequent snapshot comprises a command to create a new snapshot.

7. The method of claim 2, wherein omitting the mounting of the subsequent snapshot on the client reduces the time consumed for generating the catalog.

8. The method of claim 1, wherein synthetically generating the catalog for the subsequent snapshot comprises associating the indication of the difference between the initial snapshot and the subsequent snapshot with the preexisting catalog for the initial snapshot.

9. The method of claim 1, further comprising directing requests for data in the synthetically generated catalog that is unchanged from the preexisting catalog to the preexisting catalog.

10. The method of claim 1, wherein the indication of the difference indicates a file path of a file that was at least one of created, modified, and deleted.

11. The method of claim 1, wherein synthetically generating the catalog for the subsequent snapshot comprises modifying the preexisting catalog for the initial snapshot such that the synthetically generated catalog reflects the difference between the initial snapshot and the subsequent snapshot indicated by the storage vendor API.

12. A system for generating catalogs for snapshots, the system comprising:

an identification module, stored in memory, that identifies an initial snapshot and a subsequent snapshot for a protected volume;

a provisioning module, stored in memory, that provides identifiers of the initial snapshot and the subsequent snapshot to a storage vendor application programming interface (API);

a reception module, stored in memory, that receives, from the storage vendor API, an indication of at least one difference between the initial snapshot and the subsequent snapshot;

a generation module, stored in memory, that synthetically generates a catalog for the subsequent snapshot based on a preexisting catalog for the initial snapshot in an incremental manner by unifying the preexisting catalog and the indication of the difference in a single data structure such that the synthetically generated catalog reflects the difference between the initial snapshot and the subsequent snapshot indicated by the storage vendor API, wherein:

the reception module receives the indication of the difference in response to a request for all files that were at least one of modified, deleted, and created between the initial snapshot and the subsequent snapshot;

the preexisting catalog comprises a data structure that is separate from the initial snapshot and that tracks metadata about files within the initial snapshot to enable searching of the initial snapshot;

synthetically generating the catalog conserves storage space by omitting creation of data in the catalog for the subsequent snapshot that is unchanged from the preexisting catalog for the initial snapshot; and at least one physical processor that executes the identification module, the provisioning module, the reception module, and the generation module.

13. The system of claim 12, wherein the generation module synthetically generates the catalog for the subsequent snapshot without mounting the subsequent snapshot on a client.

14. The system of claim 12, wherein the identification module identifies the initial snapshot and the subsequent snapshot for the protected volume at least in part by receiving a backup policy that specifies a predetermined schedule for creating the initial snapshot.

15. The system of claim 12, wherein the identification module identifies the initial snapshot and the subsequent snapshot for the protected volume at least in part by receiving an alphanumeric textual identifier for the initial snapshot.

16. The system of claim 12, wherein the indication of the difference between the initial snapshot and the subsequent snapshot indicates a change in file metadata.

17. The system of claim 12, wherein:

the identifier of the initial snapshot comprises an identifier of a most recent snapshot; and the identifier of the subsequent snapshot comprises a command to create a new snapshot.

18. The system of claim 13, wherein the generation module omitting the mounting of the subsequent snapshot on the client reduces the time consumed for generating the catalog.

19. The system of claim 12, wherein the generation module synthetically generates the catalog for the subsequent snapshot in part by associating the indication of the difference between the initial snapshot and the subsequent snapshot with the preexisting catalog for the initial snapshot.

20. A non-transitory computer-readable medium comprising one or more computer-executable instructions that, when executed by at least one processor of a computing device, cause the computing device to:
- identify an initial snapshot and a subsequent snapshot for a protected volume;
- provide identifiers of the initial snapshot and the subsequent snapshot to a storage vendor application programming interface (API);
- receive, from the storage vendor API, an indication of at least one difference between the initial snapshot and the subsequent snapshot;
- synthetically generate a catalog for the subsequent snapshot based on a preexisting catalog for the initial snapshot in an incremental manner by unifying the preexisting catalog and the indication of the difference in a single data structure such that the synthetically generated catalog reflects the difference between the initial snapshot and the subsequent snapshot indicated by the storage vendor API, wherein:
- the indication of the difference is received in response to a request for all files that were at least one of modified, deleted, and created between the initial snapshot and the subsequent snapshot;
- the preexisting catalog comprises a data structure that is separate from the initial snapshot and that tracks metadata about files within the initial snapshot to enable searching of the initial snapshot; and
- synthetically generating the catalog conserves storage space by omitting creation of data in the catalog for the subsequent snapshot that is unchanged from the preexisting catalog for the initial snapshot.

* * * * *